(12) United States Patent
Leng

(10) Patent No.: US 9,710,059 B2
(45) Date of Patent: Jul. 18, 2017

(54) TRANSPARENT DISPLAY SYSTEM AND APPARATUS PROVIDED WITH THE SAME

(71) Applicant: BOE Technology Group Co., Ltd., Beijing (CN)

(72) Inventor: Changlin Leng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 34 days.

(21) Appl. No.: 14/771,515

(22) PCT Filed: Sep. 12, 2014

(86) PCT No.: PCT/CN2014/086379
§ 371 (c)(1),
(2) Date: Aug. 31, 2015

(87) PCT Pub. No.: WO2015/169018
PCT Pub. Date: Nov. 12, 2015

(65) Prior Publication Data
US 2016/0363993 A1    Dec. 15, 2016

(30) Foreign Application Priority Data

May 4, 2014    (CN) .......................... 2014 1 0184564

(51) Int. Cl.
*G06F 3/01* (2006.01)
*B60J 3/04* (2006.01)
(Continued)

(52) U.S. Cl.
CPC ............... *G06F 3/013* (2013.01); *B60J 3/04* (2013.01); *B60J 3/06* (2013.01); *B60K 35/00* (2013.01);
(Continued)

(58) Field of Classification Search
None
See application file for complete search history.

(56) References Cited

U.S. PATENT DOCUMENTS

2010/0094501 A1* 4/2010 Kwok .................... G02B 27/01
701/36
2014/0267203 A1* 9/2014 Ramanathan ............ G09G 5/10
345/207

FOREIGN PATENT DOCUMENTS

CN    101470287 A    7/2009
CN    101607520       12/2009
(Continued)

OTHER PUBLICATIONS

Second Office Action for Chinese Patent Application No. 201410184564.5 dated Jun. 28, 2016, 11 pages.
(Continued)

*Primary Examiner* — Emily Frank
(74) *Attorney, Agent, or Firm* — Westman, Champlin & Koehler, P.A.

(57) ABSTRACT

The embodiment of the present disclosure provides transparent display system and vehicle equipment provided with the same. The transparent display system may comprise: a transparent display unit positioned between user's eyes and an external light source; a position determination unit for the user's eyes configured to determine a position of user's eyes; a position determination unit for the light source configured to determine a position of the external light source; a projective coordinate calculation unit configured to calculate coordinate distribution of a projective area based on the position of the user's eyes and the position of the external light source, the projective area being a region through which the user watches and suffers from blaring so as to be shielded; and a control unit configured to generate a display control signal based on the coordinate distribution informa- (Continued)

tion of the projective area; the shielding is along the viewing direction of the user so as to display based on the display control signal to implement appropriate shielding in the projective area.

13 Claims, 4 Drawing Sheets

(51) Int. Cl.
*B60K 35/00* (2006.01)
*G06T 7/00* (2017.01)
*B60J 3/06* (2006.01)
*G06K 9/00* (2006.01)
*G02F 1/1335* (2006.01)
*G02F 1/1347* (2006.01)
*G02F 1/139* (2006.01)
*G02F 1/13* (2006.01)

(52) U.S. Cl.
CPC ...... *G06K 9/00832* (2013.01); *B60K 2350/20* (2013.01); *B60K 2350/2078* (2013.01); *B60K 2350/901* (2013.01); *G02F 1/1313* (2013.01); *G02F 1/1395* (2013.01); *G02F 1/13471* (2013.01); *G02F 1/133528* (2013.01); *G02F 2001/133531* (2013.01); *G06T 2207/30196* (2013.01)

(56) References Cited

FOREIGN PATENT DOCUMENTS

| | | |
|---|---|---|
| CN | 101607520 A | 12/2009 |
| CN | 102241235 A | 11/2011 |
| CN | 202879210 U | 4/2013 |
| CN | 103273826 A | 9/2013 |
| CN | 103986334 A | 8/2014 |
| JP | 2003-159942 A | 6/2003 |
| JP | 2003-165334 A | 6/2003 |
| JP | 2008-44603 A | 2/2008 |
| WO | 01/07276 A1 | 2/2001 |

OTHER PUBLICATIONS

International Search Report and Written Opinion for PCT Application No. PCT/CN2014/086379, dated Feb. 4, 2015, 12 pages.
English translation of Box. No. V from the Written Opinion of the International Searching Authority for PCT Application No. PCT/CN2014/086379, 4 pages.
First Office Action, including Search Report, for Chinese Patent Application No. 201410184564.5, dated Nov. 27, 2015, 12 pages.
Third Office Action for Chinese Patent Application No. 201410184564.5, dated Oct. 18, 2016, 11 pages.
Fourth Office Action from Chinese Patent Application No. 2014101845645, dated Mar. 20, 2017.

\* cited by examiner

TRANSPARENT DISPLAY SYSTEM AND APPARATUS PROVIDED WITH THE SAME

CROSS-REFERENCE TO RELATED APPLICATIONS

This application is a Section 371 National Stage Application of International Application No. PCT/CN2014/086379, filed 12 Sep. 2014, which claims the benefit of Chinese Patent Application No. 201410184564.5 filed on May 4, 2014 in the State Intellectual Property Office of China, the whole disclosure of which is incorporated herein by reference.

TECHNICAL FIELD

The present disclosure relates to the display field, and In particular to a transparent display system and an apparatus provided with the same.

BACKGROUND

With rapid development of Liquid crystal display, the liquid crystal display becomes dominant in the display field and applied to various fields in daily life. In recent years, it is known that vehicle display system provided in vehicles such as a car is in behalf of various navigators, vehicle television and the like. However, the existing vehicle display system are mostly used to display various information to users (the example of which is a driver), there is not any substantial assistance for the driver to drive the car. For example, during driving, blazing light sources such as sun, high beam in the front vehicles and the like will affect eyes of the drivers and is adverse to safety and comfort of the driving. In addition, apparatus such as transparent external walls of a building and camera of monitors suffer from influence of the external light sources, which leads a feeling of glaring, so it is impossible to get a vivid image. Thus, it needs a transparent display system capable of avoiding glaring.

SUMMARY

One embodiment of the present invention provides a transparent display system and an apparatus provided with the same, which are capable of preventing the strong light sources from irradiating to the human eyes during driving and facilitating safety and comfort for the users.

According to one aspect of the present invention, there is provided a transparent display system, which comprises: a transparent display unit positioned between at least one image acquiring unit and an external light source; a position determination unit for the image acquiring unit, configured to determine a position of the image acquiring unit and to output a position information about the image acquiring unit to a projective coordinate calculation unit; a position determination unit for the light source, configured to determine a position of the external light source and to output a position information about the external light source to the projective coordinate calculation unit; a projective coordinate calculation unit, configured to calculate coordinate distribution of a projective area based on the position information about the image acquiring unit and the position information about the external light source, and to output a coordinate distribution information corresponding to the coordinate distribution to a control unit, the projective area is a region in the transparent display unit the display state of which needs to be adjusted; a control unit, configured to generate a display control signal based on the coordinate distribution information and to output the display control signal to the transparent display unit; wherein the transparent display unit displays based on the display control signal so as to adjust display states of the projective area in the transparent display unit.

Preferably, the image acquiring unit may be user's eyes, and the position determination unit for the image acquiring unit is configured to determine a position of user's eyes and to output information about the position of the user's eyes to the projective coordinate calculation unit.

Preferably, the image acquiring unit may be a vehicle recorder or an outdoor monitor.

According to another aspect of the present disclosure, there is provided an apparatus including the transparent display system as mentioned above.

In particular, the apparatus may be vehicle equipment. The transparent display unit of the transparent display system may be stacked on a windshield of the vehicle or a transparent shell of the outdoor monitor, or may be integrated with the windshield together to be an integrated arrangement; the transparent display panel layer of the transparent display may be stacked on the user's glasses or directly functions as the lens of the glasses or the transparent display panel layer of the transparent display may be stacked on shop windows, external windows for a building and so on.

When the transparent display system and the apparatus provided with the transparent display system according to the embodiments of the present disclosure operate, the projective coordinate calculation unit firstly calculates a projective area on the transparent display unit to be shielded based on positions of the image acquiring unit (e.g. user's eyes, outdoor monitor, vehicle recorder and so on) and positions of the external light source, and outputs to the control unit; the control unit generates a display control signal from it and output the display control signal to the transparent display unit; the transparent display unit displayers based on the display control signal so as to shield light in the projective area. For example, it may avoid blazing light source affecting eyes of the drivers so as to ensure user's safety and comfort of the driving; and when the external light source influences the quality of the image acquired by the monitor, it may avoid the external light source affecting the imaging of the image acquiring unit, so as to improve quality of the image of the image acquiring unit.

BRIEF DESCRIPTION OF THE DRAWINGS

The embodiments of the present disclosure would be illustrated by referring to the accompany figures, in which.

DETAILED DESCRIPTION

Figure 1:
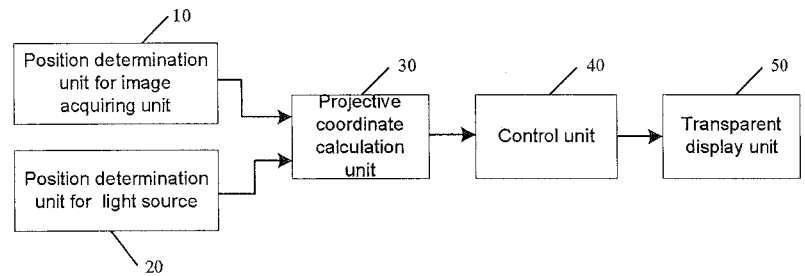
FIG. 1 is a structural diagram of one transparent display system according to an embodiment of the present disclosure.

The embodiments of the present disclosure will be described in more details below with reference to the accompanying drawings. It is obvious that the illustrated embodiments are not all of the embodiments, but a part of the embodiments of the present disclosure. Throughout the description, like or similar reference numerals denote like elements.

FIG. 1 shows a structural diagram of one transparent display system according to an embodiment of the present disclosure. As shown in FIG. 1, the transparent display system comprises: a transparent display unit 150 positioned between at least one image acquiring unit and an external light source; a position determination unit 10 for the image acquiring unit configured to determine a position of the image acquiring unit and to output a position information about the image acquiring unit to a projective coordinate calculation unit 30; a position determination unit 20 for the light source configured to determine a position of the external light source and to output a position information about the external light source to the projective coordinate calculation unit 30; the projective coordinate calculation unit 30 configured to calculate coordinate distribution of a projective area based on the position information about the image acquiring unit and the position information about the external light source, and to output a coordinate distribution information corresponding to the coordinate distribution to a control unit 40, the projective area is a region in the transparent display unit the display state of which needs to be adjusted; a control unit 40 configured to generate a display control signal based on the coordinate distribution information and to output the display control signal to the transparent display unit; wherein the transparent display unit displays based on the display control signal so as to adjust display states of the projective area in the transparent display unit.

In particular, the image acquiring unit may be user's eyes, and the position determination unit for the image acquiring unit is configured to determine a position of user's eyes and to output information about the position of the user's eyes to the projective coordinate calculation unit. In addition, the image acquiring unit may be a vehicle recorder, and may avoid influence on the image captured by the vehicle recorder by shielding blazing sun light. The image acquiring unit may be an outdoor monitor and may avoid the external sun light's influence on the image captured by the outdoor monitor by adjusting displaying state on the transparent display unit added to a transparent shell of the outdoor monitor. By taking the vehicle recorder as an example, since the position at which the vehicle recorder is installed is fixed, the position of the vehicle recorder can be obtained when the vehicle recorder is fixed, so as to omit devices similar to the position determination unit for the image acquiring unit as mentioned above. Similarly for the outdoor monitor, its positioned can be determined during being installed, so that the position determination unit for the image acquiring unit may also be omitted.

In particular, the step of adjusting the display states of the projective area may comprise making the projective area opaque, translucent or shielding the projective area and so on.

The embodiment in which the image acquiring unit may be user's eyes would be illustrated in detail below.

Figure 2:
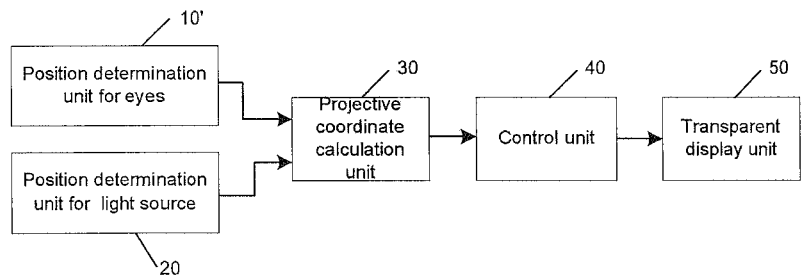
FIG. 2 is a structural diagram of another transparent display system according to an embodiment of the present disclosure.

FIG. 2 is a structural diagram of the transparent display system according to one preferred embodiment of the present disclosure. As shown in FIG. 2, the transparent display system comprises: a transparent display unit 50 positioned between user's eyes and an external light source; a position determination unit 10 for the user's eyes configured to determine a position of user's eyes (i.e. the position determination unit for the image acquiring unit) and to output a position information about the eyes to a projective coordinate calculation unit 30; a position determination unit 20 for the light source configured to determine a position of the external light source and to output a position information about the external light source to the projective coordinate calculation unit 30; the projective coordinate calculation unit 30 configured to calculate coordinate distribution of a projective area based on the position information about eyes and the position information about the external light source, and to output a coordinate distribution information corresponding to the coordinate distribution to a control unit 40, the projective area is a region in the transparent display unit the display state of which needs to be adjusted; the control unit 40 configured to generate a display control signal based on the coordinate distribution information and to output the display control signal to the transparent display unit; wherein the transparent display unit 50 displays based on the display control signal so as to adjust display states of the projective area in the transparent display unit.

The position determination unit 10 for the eyes which is configured to determine the position of the user's eyes and the position determination unit 20 for the light source which is configured to determine the position of the external light source may be implemented in various forms which is well known for those skilled in the art and it is not limited in the present disclosure. For example, the position of the user's eyes (or the external light source) may be determined by capturing images and then identifying the user's eyes (or the external light source) within the captured imaged through an identification technique.

The projective coordinate calculation unit 30 is configured to calculate coordinate distribution of the projective area based on the position of the user's eyes and the position of the external light source. The projective area is a region which needs to be shielded since the user experiences glaring when the user watches the transparent display unit, which may be implemented in various forms. For example, an optical engineering may determine the projective area based on optical paths or may set the projective area in a particular application based on experiences.

Figure 3:
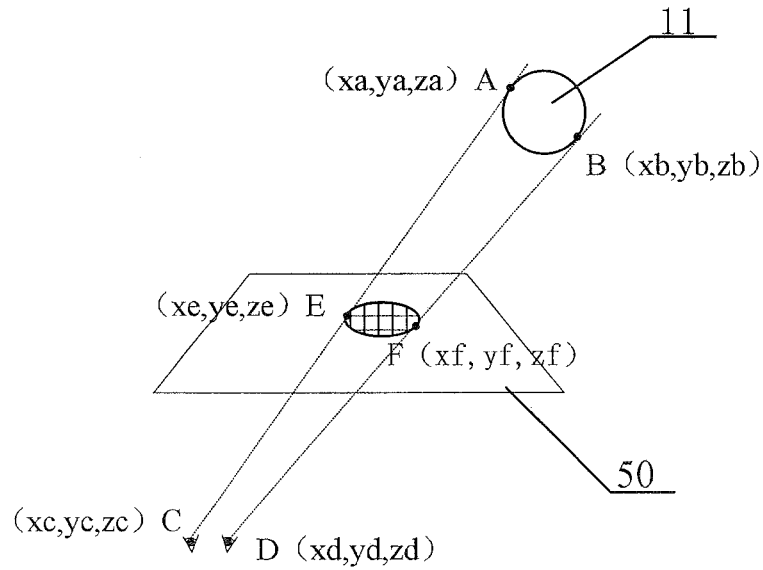
FIG. 3 is a schematic view of determining the projective area based on the position of user's eyes and the position of the external light source.

FIG. 3 shows a simple scheme for determining the position of user's eyes and the position of the external light source. As shown in FIG. 3, in the present embodiment, the coordinates of the human's left and right eyes are taken to be the information about the position of the eyes for illustration. However, the present invention is not limited to it. The information about the human's left and right eyes may be combined to be the information about the position of the eyes. For brevity, the user's eyes may be simplified to be one point in a three dimensional space. Two tangent lines of AC and DB are made from the user's left eye C and right eye D to the most left side A and the most right side B of the external light source 11. Intersection points of the lines AC and DB with the transparent display unit 50 are points E and F. The projective area may be determined by weighting the coordinates of the intersection points E and F. For example, the projective area is generally provided with a shape of circle or ellipse. In particular, a line segment EF determined by the intersection points E and F functions as a major axis of the ellipse, and length of the line section EF multiplied by one weighting value functions as a minor axis of the ellipse. The weighting value is generally less than or equal to 1, and its particular value may be set according to actual situation and experiences. When the weighting value is equal to 1, the projective area is a circle. It will be understood for those skilled in the art that the means for determining the projective area as shown in FIG. 3 is only one possible implementation, and can' be deemed to limit the present invention. For example, the projective area may have a shape of diamond, rectangle and so on which take the line segment EF as its diagonal line. Furthermore, since the transparent display unit arranged between the user and the light source is not always perpendicular to a connection line between the user and the light source and a plane in which the transparent display unit is located is inclined, the actual shape of the projective area may be a projection of the shapes as mentioned above in the plane in which the transparent display unit is located.

The control unit 40 generates a display control signal based on the coordinate distribution of the projective area. The transparent display unit 50 displays based on the display control signal so as to adjust display states of the projective area. For example, the projective area may be shielded. Herein, the shielding may be a light proof shielding, or may be a gray scale shielding with a reduced transmittance. The control unit 40 generates the display control signal for the projective area, so as to implement shielding on the transparent display unit 50. The displaying of the transparent display unit 50 may be done in various manners, such as Liquid Crystal display, Organic Lighting display, Electroluminescence display and so on. The particular arrangement of the control unit 40 may vary with the displaying principle of the transparent display unit 50, and will be further illustrated in detail in conjunction with the particular embodiment below.

The transparent display system of the embodiment of the present disclosure firstly calculates the projective area to be shielded due to glaring sense based on the position of the user's eyes and the position of the external light source, and output to the control unit in a form of coordinate distribution information; the control unit generates a display control signal based on the coordinates distribution information and output to the transparent display unit; and the transparent display unit displays based on the display control signal and adjusts display states of the projective areas so as to implement shielding in the projective areas. Thus, the influence of the strong light source of human's eyes in a scene such as driving is avoided so as to facilitate user's safety and comfort.

The transparent display system of the embodiment of the present invention may be installed on vehicles, glasses, shop windows, external windows in a building and so on, so as to avoid a glaring effect generated by the external light source. In order to further assist those skilled in the art to understand the transparent display system provided by the embodiment of the present disclosure, the transparent display system provided by the present disclosure will be illustrated in detail by taking the transparent system installed on a car as an example.

Figure 4:
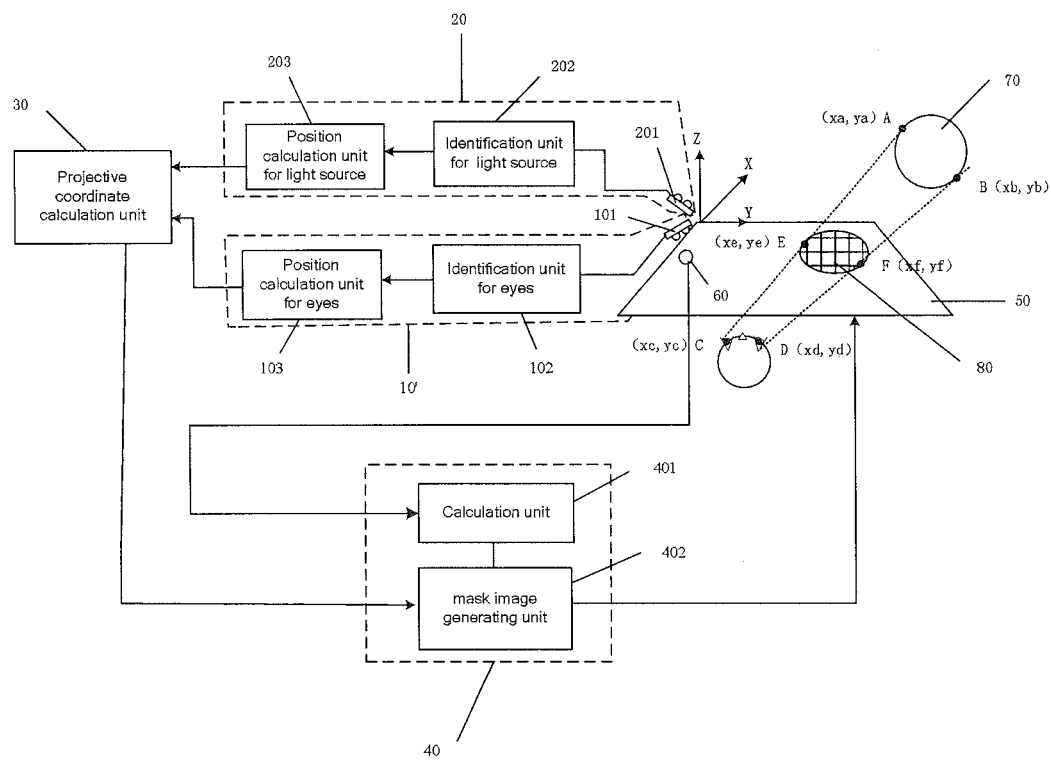
FIG. 4 is a schematic structural diagram of a transparent display system according to an embodiment of the present disclosure.

As shown in FIG. 4, the embodiment provides a transparent display system for a car. The transparent display system may comprise a position determination unit 10' for human's eyes, a position determination unit 20 for the light source, a projective coordinate calculation unit 30, a control unit 40, a transparent display unit 50; and it further comprises a light sensor 60 for detecting brightness in the environment in which the user is positioned (e.g. the brightness in a vehicle cab, the brightness in the environment in which the user wearing glasses is positioned). The transparent display unit 50 of the present embodiment is a transparent display. In particular, a transparent display panel in the transparent display is stacked on the windshield of the vehicle or directly functions as the windshield of the vehicle, the transparent display panel in the transparent display is stacked on the user's glasses or directly function as lens of the glasses, or the transparent display panel in the transparent display is stacked on the shop windows or the external window of the buildings.

In particular, in the present embodiment, the position determination unit 10 for the eyes may comprise: an image sensor 101 configured to obtain image information about the image including the user's eyes; eyes identification unit 102 configured to identify information corresponding to the user's eyes from the image information; position calculation unit 103 for the eyes, which is configured to calculate the position information of the user's eyes based on the information corresponding to the user's eyes and identified from the image information. In particular, the position determination unit 20 for the light source may comprise an image sensor 201, which is configured to obtain image information of external light source; an identification unit 202 for the light source, which is configured to identify the information corresponding to the external light source from the image information of the external light source; a position calculation unit 203 for the light source, which is configured to calculate a position information of the external light source based on the image information corresponding to the external light source and identified from the image information of the external light source. The sensors 101 and 202 may be devices such as a camera.

The projective coordinate calculation unit 30 is configured to calculate coordinate distribution of the projective area based on the position of the user's eyes and the position of the external light source, and to output to the control unit 40. The projective coordinate calculation unit may be implemented in various forms and one simple scheme is taken as an example for illustration.

The coordinate system for the transparent display system according to the present disclosure may be arbitrarily selected. In the following, the top left corner of the windshield in the car is defined as an origin of the coordinate system, the horizontal plane is defined as the plane defined by the X-Y axes, and the vertical direction is defined as the direction of Z axis. The humans' eyes, external light source (by taking the sun as an example) and the transparent display unit provided on the windshield are within the coordinate system. Furthermore, depending on different scenes, the actual projective area may be windshield of a car, glasses, external window of a building, and external transparent shell of a camera for a video monitoring system and so on.

The position determination unit 10' for human's eyes in the present embodiment is particularly configured to obtain coordinates of the user's left and right eyes; and the position determination unit 20 for the light source is particularly configured to obtain coordinates of the most left end and the most right end of the external light sources. In particular, in the present embodiment, there are installed two image sensors 101 and 202. The image sensor 101 is configured to capture images of human's eyes and the coordinate C(Xc, Yc, Zc) of the left eyes and the coordinate D (Xd, Yd, Zd) can be obtained by the eyes identification unit 102 and the position calculation unit 103 for the eyes 103. Similarly, the position of the sun in the coordinate system can be obtained by the image sensor 202, the identification unit 202 for the light source and the position calculation unit 203 for the light source so as to get the coordinate A(Xa, YA, Za) of the most left end of the sun and the coordinate B (Xb, Yb, Zb) of the most right end of the sum. The most left end and the most right end of the sun are two intersection points at which a plane defined by the users' eyes and a center of the sun intersects with a profile line of the sun 70. A connecting line from the user's left eye C (Xc, Yc, Zc) to the most left end A (Xa, Ya, Za) of the sun 70 is labeled as a first connecting line AC, and a connecting line from the user's right eye D (Xd, Yd, Zd) to the most right end B (Xb, Yb, Zb) of the sun 70 is labeled as a second connecting line BD. Based on intersection of these straight lines and the plane, an intersection point E (Xe, Ye, Ze) at which the first connecting line AC intersects with the plane of the windshield and an intersection point F (Xf, Yf, Zf) at which the second connecting line BD intersects with the plane of the windshield can be obtained by the projective coordinate calculation unit 30. Then, the projective coordinate calculation unit 30 determine the coordination distribution of the projective area based on the coordinate of the intersection point E (Xe, Ye, Ze) and the coordinate of the intersection point F (Xf, Yf, Zf). For example, the projective area in FIG. 3 is set to be an ellipse, and a line segment EF defined by the intersection points E and F functions as the major axis of the ellipse, and the length of the line section EF multiplied by some weighting value functions as the minor axis of the ellipse, in which the weighting value is generally less than or equal to 1 and may be set according to actual situation and experiences. Furthermore, tangent lines from the left eye to respective points on the profile line of the sun are made and regions defined by the points at which these tangent lines intersect with the windshield form the first projective area. Similarly, tangent lines from the right eye to respective points on the profile line of the sun are made and regions defined by the points at which these tangent lines intersect with the windshield form the second projective area. A union set of the first and second projective areas determine the projective area of the present embodiment.

A shielded region 80 at least overlays the projective areas determined by the above mentioned method. The shielded region 80 may be larger than the projective area of the sun on the windshield in proportion. The shielded region 80 may change with the relative position of the human's eyes and the sun. For example, the shielded region may be updated at a frame frequency of 60 Hz.

The step of displaying by the projective coordinate calculation unit based on the display control signal in the present embodiment may comprise displaying a mask image on the transparent display to shield. The display control signal input t to the transparent display unit 50 in the present embodiment may comprise signal of the mask image to be displayed on the transparent display to shield. In particular, the control unit 40 generates the mask image corresponding to the projective area of the sun on the windshield, so the control unit 40 particularly comprises a calculation unit 401 and a mask image generating unit 402. A light sensor 60 is configured to output a detected brightness to the calculation unit 401, and the calculation unit 401 calculates filling gradation for each of the pixels in the projective area. The particular value of the filling gradation is selected so that when the transparent display unit displays the mask image, the user does not suffer from blaring after the direct light of the external light source transmits through the projective area filed by gradation. The gradation may be set by those skilled in the art according to actual situation and experiences: the darker the environment where the user is located, the closer the effect of the gradation filling approaches an opaque shielding; and the brighter the environment where the user is located, the closer the effect of the gradation filling approaches a transparent shielding.

In a particular implementation, the particular value of the filling gradation should implement an effect so that when the direct light of the external light source transmits through the transparent display, it has a brightness which is close to that of the environment in which the user is located. In particular, the light sensor 60 collects brightness of the environment within the vehicle cab; the calculation unit 401 adaptively calculates the filing gradation of the filling shape corresponding to the projective area so that the sun light after being shielded by the mask image can't remarkably glares the human's eyes. That is to say, the light transmittance at the mask image (light transmittance of the mask image generated due to the filling gradation) should be (brightness of the environment within the vehicle cab)/(brightness of the sun light at outer surface of the windshield*intrinsic light transmittance of the transparent display panel).

Then, the filling gradation corresponding to the mask image may be obtained by a curve of the panel transmittance-gradation generated due to the filling gradation. The gradation corresponding to the regions except that corresponds to the projective area is L255 (transparent) or may be any images of any gradation. The mask image generating unit 402 is configured to provide the pixels in the regions corresponding to the projective area with the filling gradation and provide the pixels in the remaining regions to be transparent, so as to generate the mask image. When the mask image is input to the transparent display to be displayed, the shielding is implemented in the projective area.

The projective coordinate calculation unit 30 may update the coordinate distribution of the projective area at a frame frequency of 60 Hz of the transparent display unit (or at other frequencies, such as double, ½, ⅓ frequency of the frame frequency and so on), and the coordinate distribution information corresponding to the updated coordinate distribution is output to the control unit 40. The shielded region 80 may be larger than the projective area of the sun on the windshield in proportion. The shielded region 80 may change with the relative position of the human's eyes and the sun. For example, the shielded region may be updated at a frame frequency of 60 Hz. The control unit 40 then updates the display control signal at a frame frequency of the transparent display unit 50. The control unit 40 generates an updated display control signal based on the coordinate distribution information corresponding to the updated coordinate distribution, and output the updated display control signal to the transparent display unit 50, and finally display an image with an adaptive gradation on the vehicle's windshield, on which shape, position and gradation of the shielded region 80 vary with the brightness of the sun light and the straight line from the human's eyes to the sun. Thus, the blaring region caused by the sun light will be effectively shielded so as to avoid the blaring of the sun light to the human's eyes and to facilitate safety and comfort during driving.

Figure 5:
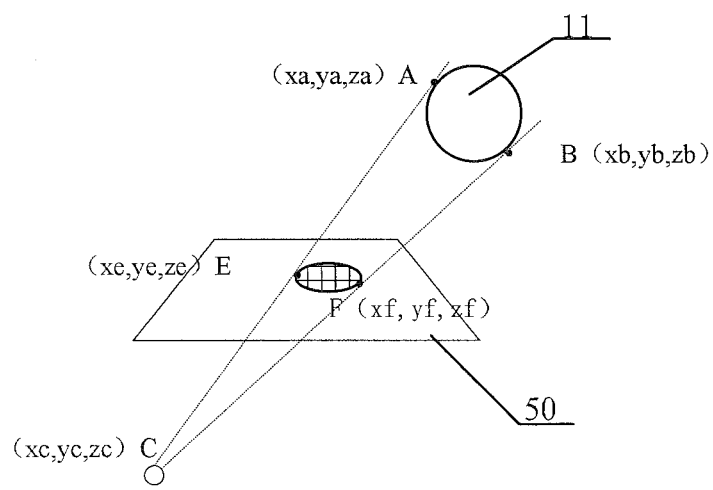
FIG. 5 is a schematic view of determining a projective area based on position of the vehicle recorder and the position of the external light source according to an embodiment of the present disclosure.

FIG. 5 is another scheme for determining positions of the vehicle recorder and the external light source. As shown in FIG. 5, the present embodiment takes the coordinate of the vehicle recorder as the position information about the image acquiring unit. However, the present invention is not limited to it. For brevity, the position of the vehicle recorder may be simplified to be one point in a three dimensional space. Two tangent lines of AC and DB are made from the point to the most left side A and the most right side B of the external light source 11. Intersection points of the lines AC and DB with the transparent display unit 50 are points E and F. The projective area may be determined by weighting the coordinates of the intersection points E and F. For example, the projective area is generally provided with a shape of circle or ellipse. In particular, a line segment EF determined by the intersection points E and F functions as a major axis of the ellipse, and length of the line section EF multiplied by one weighting value functions as a minor axis of the ellipse. The weighting value is generally less than or equal to 1, and its particular value may be set according to actual situation and experiences. When the weighting value is equal to 1, the projective area is a circle. It will be understood for those skilled in the art that the means for determining the projective area as shown in FIG. 3 is only one possible implementation, and can' be deemed to limit the present invention. For example, the projective area may have a shape of diamond, rectangle and so on which take the line segment EF as its diagonal line. Furthermore, since the transparent display unit arranged between the user and the light source is not always perpendicular to a connection line between the user and the light source and a plane in which the transparent display unit is located is inclined, the actual shape of the projective area may be a projection of the shapes as mentioned above in the plane in which the transparent display unit is located.

Figure 6:
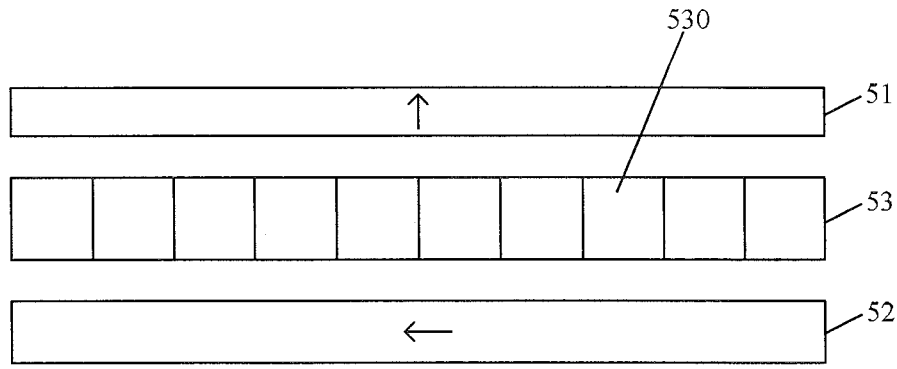
FIG. 6 is a structural diagram of a transparent display unit in another transparent display system according to an embodiment of the present disclosure.
Figure 7:
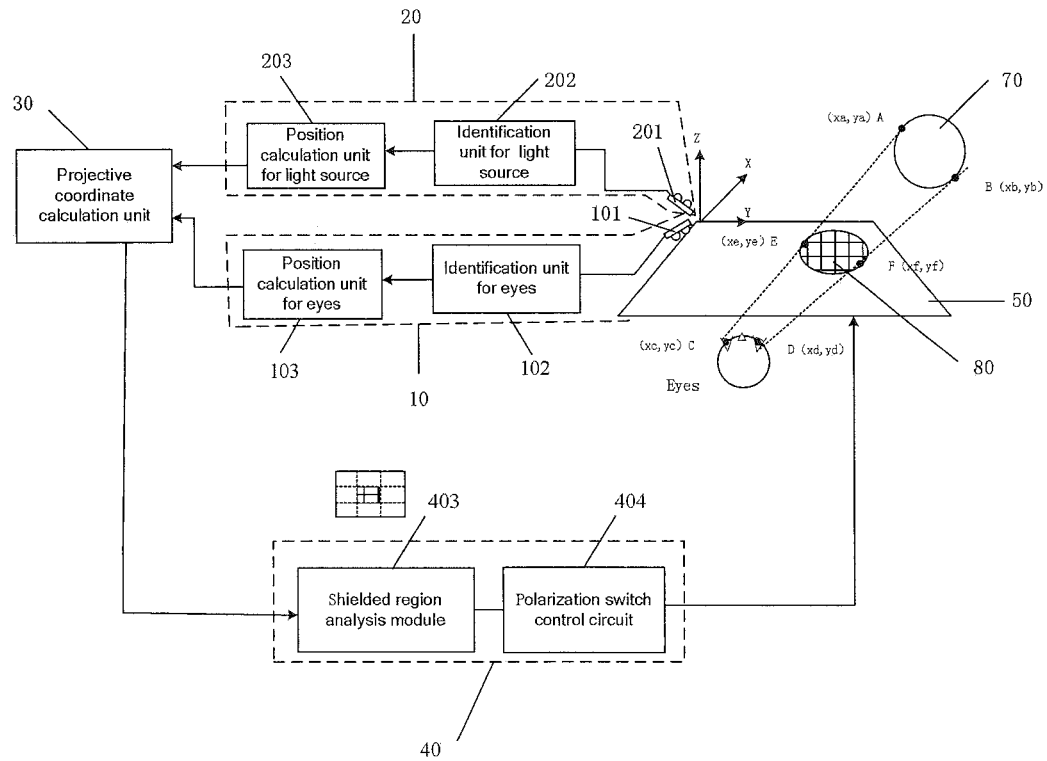
FIG. 7 is a schematic structural diagram of another transparent display system according to an embodiment of the present disclosure.

In a preferred embodiment of the present invention, the transparent display unit 50 may comprise a polarization control unit which is configured to adjust display states of the projective area in the transparent display unit by changing polarization states of the light transmitted through the transparent display unit. The embodiment utilizing the polarization control unit will be illustrated in detail with reference to FIG. 6 and FIG. 7. FIG. 6 shows a structural diagram of a transparent display unit in another transparent display system according to an embodiment of the present disclosure. FIG. 7 shows a schematic structural diagram of another transparent display system according to an embodiment of the present disclosure. As shown in FIG. 6 and FIG. 7, the embodiment of the present disclosure provides another transparent display system applied for windshield of a car, glasses, external window of a building, and external transparent shell of a camera for a video monitoring system and so on. The scene for the windshield of a car is taken as an example for illustration below.

The transparent display unit according to the present embodiment as shown in FIG. 6 comprises: an upper polarizer 51, a lower polarizer 52 and a polarization switching shield 53 provided between the upper polarizer 51 and the lower polarizer 52. The polarization directions of the upper polarizer 51 and the lower polarizer 52 are perpendicular to each other. The polarization switching shield 53 comprises a plurality of polarization units 530. When the light generated by the external light source transmits through the upper polarizer, the light is converted to a polarized light with a predetermined polarization direction. When the polarization unit 530 is in an off state, it generates a polarized polarity; when the polarized light passes through the polarization unit, its polarization direction changes 90 degree so that the light may transmit through the lower polarizer. When the polarization unit 530 is in an on state, the polarized light does not changes its polarization direction during transmitting through the polarization unit, so that the light can't transmit through the lower polarizer; at this moment, an effect of shielding can be obtained. Preferably, the polarization switching shield 53 may be made from liquid crystal in an optically controlled birefringence mode, and one electrode which can be independently driven is provided within each of the polarization units 530. It should be understood that the upper and lower polarizer and the polarization switches may comprise various states different from those mentioned above, as long as they may implement an effect of controlled polarization extinction. In particularly, the polarization switching shield may be made from liquid crystal in an optically controlled birefringence mode. The control unit of the present embodiment may comprise a shielded region analysis module 403 and a polarization switching control circuit 404 for controlling the polarization unit 530. The shielded region analysis module 403 is configured to determine which of the polarization units 530 correspond to the projective area according to the coordinate distribution information of the projective area, generate instructions for controlling these polarization units 530 to be switched on, and input to the polarization switching control circuit 404. The polarization switching control circuit 404 converts the signals and generates a display control signal for switching on the polarization unit 530 corresponding to the projective area according to the instructions for switching on. Thus, when the polarization unit 530 corresponding to the projective area is in an on state, the polarized light formed after transmitting through the upper polarizer 51 does not change its polarization direction during passing through the polarization unit and complies that of the polarization direction of the upper polarizer 51. Thus, when such a polarized light arrives at the lower polarizer 52, the polarized light is shielded. Since the polarization units 530 outside the projective area are in off state, the polarized light changes its polarization direction 90 degree during passing through the polarization unit. Since its polarization direction complies with that of the lower polarizer 52, the polarizer light directly transmits through the lower polarizer without being shielded.

In a particular implementation, the display area of the windshield is divided into M×N regions, each of which is provided with one polarization unit 530 corresponding to one electrode which may be independently driven. The labeled variants corresponding to the respective regions are identified as Top1, Top2 . . . Ton N. Based on results of the projective coordinate calculation unit 30, the value corresponding to the region which needs to be shielded is set to be logic 1, and the value corresponding to the region which does not need to be shielded is set to be logic 0.

Figure 8:
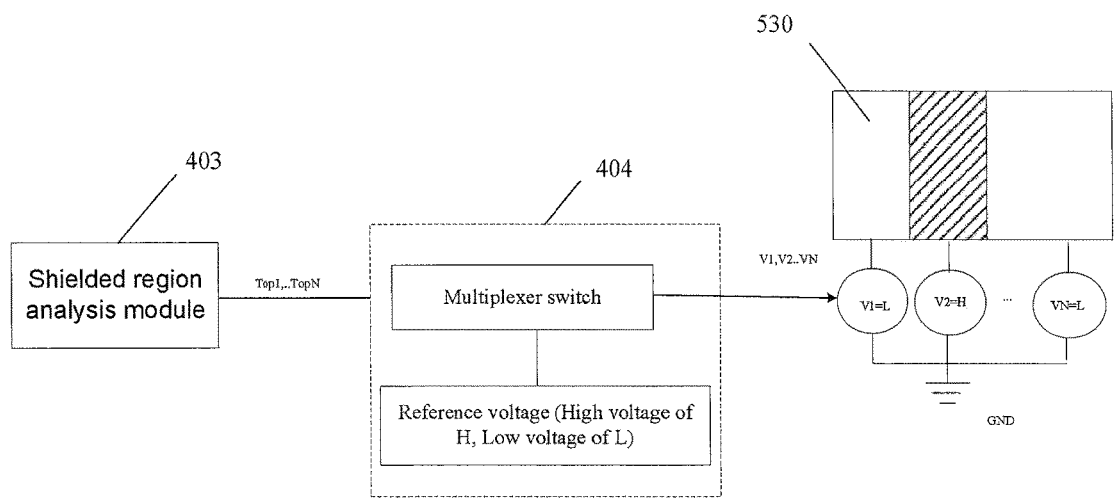
FIG. 8 is a schematic functional diagram of a polarization switch control circuit in the other transparent display system according to an embodiment of the present disclosure.

FIG. 8 is a schematic view of the basic principle of a polarization switch control circuit 404 according to an embodiment of the present disclosure. Based on the logic results of Top1, Top2 . . . Top N output by the shielded region analysis module 403, a multiplexer switch in the polarization switching control circuit 404 selects different reference voltages (a high level H is applied to the polarization units 530 corresponding to the projective area, and a low level L is applied to the remaining polarization units 530). When the logic results of Top1, Top2 Top N output by the shielded region analysis module 403 get a numerical value of 1, a high level H is correspondingly output; and when the logic results get a numerical value of 0, a low level L is correspondingly output, so as to implement a digital to analog conversation to output polarization voltages of V1, V2 . . . VN which are input to the respective polarization units 530, respectively. Thus, the respective regions of the polarization switching shied 53 are controlled in polarization. An effect of shielding is obtained in the polarization unit 530 corresponding to the projective area due to application of the high level H, and an effect of transparence or translucency is obtained in the remaining polarization units 530 due to application of the low level L. Thus, the shielding of the projective area may be done by controlling the transmitting through and shielding of the light.

Thus, the transparent display system according to embodiments of the present disclosure may directly control switching of the polarization units 530 in the projective area so as to control the transmitting and shielding of the light to implement shielding of the projective area. The transparent display system according to embodiment of the present disclosure does not needs the transparent display system as shown in FIG. 4 to generate a mask image to be displayed.

Moreover, the projective coordinate calculation unit 30 and the control unit 40 may further update the display control signal according to the frame frequency of the transparent display unit 50. That is to say, the switches of the polarization units 530 may be updated at some frequency and finally an adaptive shielding shape is displayed on the windshield of the car, and the shape, position and gradation of the shielded region 80 vary with the brightness of the sun light and the straight line from the human's eyes to the sun. Thus, the blaring region caused by the sun light will be effectively shielded so as to avoid the blaring regions caused by the sun light are effectively shielded so as to avoid blazing sun light affecting eyes of the drivers so as to ensure user's safety and comfort of the driving.

The embodiment of the present disclosure provides an apparatus including the transparent display system as mentioned above. The apparatus may be vehicle equipment. The transparent display unit of the transparent display system may be stacked on a windshield of the vehicle or a transparent shell of the outdoor monitor, or may be integrated with the windshield together to be an integrated arrangement; the transparent display panel layer of the transparent display may be stacked on the user's glasses or directly functions as the lens of the glasses or the transparent display panel layer of the transparent display may be stacked on shop windows, external windows for a building and so on. The apparatus may be applied to any scenes which encounter glaring. For example, the apparatus may be vehicles such as a car, a train, an airplane and so on. The apparatus may be products or components used in scenes which encounter glaring such as glasses, shop windows, vehicle recorder, outdoor monitors and so on. The present invention may avoid blazing light source affecting eyes, cameras and image acquiring devices so as to protect visual acuity and to improve the quality of the captured image, and may facilitate user's safety and comfort.

It will be understood for those skilled in the art that all of or a part of the flowchart in the method according to the embodiment as mentioned above can be accomplished by a computer program instructing relevant hardware. The program may be stored in one computer readable storage medium. When being executed, the program may comprise the flowchart of the method according to embodiment of the present disclosure. The storage medium may be a magnetic disk, an optical disk, a Read-only memory (ROM) or a Random access Memory (RAM) and the like.

The embodiments as mentioned above do not limit but illustrate the present invention. Those skilled in the art may make various change or modification to the technical solution of the present disclosure by without departing from the scope of the present disclosure defined by the accompany claims. In the claims, any reference signs positioned between the parentheses can't be interpreted as limiting the claims. The term "comprising" does not exclude presence of elements or steps beyond those listed in any claims or the description. The article of "a" or "an" preceding the element does not exclude the presence of a plurality of the element, vice versa. The present invention can be implemented by hardware including several distinct elements and may be implemented by a computer which is appropriately programmed. In an apparatus claim enumerating several means, some of these means can be particularly implemented by identical hardware. The mere fact is that some measurements cited in some different dependent claims do not indicate that they can be advantageously combined to use.

I claim:

1. A transparent display system, comprising:
 a transparent display unit positioned between at least one image acquiring unit and an external light source;
 a position determination unit for the image acquiring unit, configured to determine a position of the image acquiring unit and to output a position information about the image acquiring unit to a projective coordinate calculation unit;
 a position determination unit for the light source, configured to determine a position of the external light source and to output a position information about the external light source to the projective coordinate calculation unit;
 the projective coordinate calculation unit, configured to calculate coordinate distribution of a projective area based on the position information about the image acquiring unit and the position information about the external light source, and to output a coordinate distribution information corresponding to the coordinate distribution to a control unit, the projective area is a region in the transparent display unit the display state of which needs to be adjusted;
 the control unit configured to generate a display control signal based on the coordinate distribution information and to output the display control signal to the transparent display unit;
 wherein the transparent display unit displays based on the display control signal so as to adjust display states of the projective area in the transparent display unit, wherein the image acquiring unit is user's eyes, and the position determination unit for the image acquiring unit is configured to determine a position of user's eyes and to output information about the position of the user's eyes to the projective coordinate calculation u therein the position determination unit for the image acquiring unit is configured to obtain coordinates of the left and right eyes of the users;
 the position determination unit for the light source is configured to obtain coordinates of the most left end and the most right end of the external light source, the most left end and the most right end of the external light source are two intersection points at which a plane defined by the user's eyes and a center of the external light source intersects with a profile line of the external light source; and the projective coordinate calculation unit is configured to determine a coordination distribution of the projective area based on the coordinate of the intersection points at which a first connecting line and a second connecting line intersect with the transparent display unit, the first connecting line is a connecting line from the user's left eye to the most left end of the external light source, and the second connecting line is a connecting line from the user's right eye to the most right end of the external light source.

2. The transparent display system according to claim 1, wherein the image acquiring unit is a vehicle recorder or an outdoor monitor.

3. The transparent display system according to claim 1, wherein the transparent display unit comprises a polarization control unit which is configured to adjust display states of the projective area in the transparent display unit by changing polarization states of the light transmitted through the transparent display unit.

4. The transparent display system according to claim 3, wherein the polarization control unit comprises an upper polarizer, a lower polarizer and a polarization switching shield provided between the upper polarizer and the lower polarizer, the polarization directions of the upper polarizer and the lower polarizer are perpendicular to each other; and the polarization switching shield comprises a plurality of polarization units; when the polarization unit is in an off state, the polarized light passes through the polarization unit and its polarization direction changes 90 degree; and when the polarization unit is in an on state, the polarization direction of the polarized light does not change during transmitting through the polarization unit.

5. The transparent display system according to claim 4, wherein the polarization switching shield is made from liquid crystal in an optically controlled birefringence mode.

6. The transparent display system according to claim 1, wherein adjusting the display states of the projective area comprises making the projective area opaque or translucent.

7. The transparent display system according to claim 1, further comprising a light sensor for detecting brightness in the environment in which the user is positioned, the step of displaying based on the display control signal comprising displaying a mask image on the transparent display to shield; and the control unit comprising a calculation unit and a mask image generating unit,
the light sensor is configured to output a detected brightness to the calculation unit,
the calculation unit is configured to calculate filling gradation for each of the pixels in the projective area based on information about the brightness;
the mask image generating unit is configured to provide the pixels in the regions corresponding to the projective area with the filling gradation and provide the pixels in the remaining regions to be transparent, so as to generate the mask image.

8. The transparent display system according to claim 1, wherein the position determination unit for the image acquiring unit comprising:
an image sensor, which configured to obtain image information about the image including the image acquiring unit;
an image acquiring unit identification module, which is configured to identify information corresponding to the image acquiring unit from the image information including the image acquiring unit;
an image acquiring unit position calculation unit, which is configured to calculate the position information of the image acquiring unit based on the image information corresponding to the image acquiring unit and identified from the image information.

9. The transparent display system according to claim 1, wherein the position determination unit for the light source comprising:
an image sensor, which is configured to obtain image information of external light source;
an identification unit for the light source, which is configured to identify the information corresponding to the external light source from the image information of the external light source;
a position calculation unit for the light source, which is configured to calculate a position information of the external light source based on the image information corresponding to the external light source and identified from the image information of the external light source.

10. The transparent display system according to claim 1, wherein
the position determination unit for the image acquiring unit is configured to obtain coordinates of perimeters of the image acquiring unit;
the position determination unit for the light source is configured to obtain coordinates of the most left end and the most right end of the external light source, the most left end and the most right end of the external light source are two intersection points at which a plane defined by the image acquiring unit and a center of the external light source intersects with a profile line of the external light source;
the projective coordinate calculation unit is configured to determine a coordination distribution of the projective area based on the coordinate of the intersection points at which a first connecting line and a second connecting line intersect with the transparent display unit, the first connecting line is a connecting line from the most left end of the image acquiring unit to the most left end of the external light source, and the second connecting line is a connecting line from the most right end of the image acquiring unit to the most right end of the external light source.

11. The transparent display system according to claim 1, wherein
the projective coordinate calculation unit is further configured to update the coordinate distribution of the projective area at a frame frequency of the transparent display unit;
the control unit is further configured to update the display control signal based on the coordinate distribution information corresponding to the updated coordinate distribution, and output the updated display control signal to the transparent display unit.

12. An apparatus, comprising the transparent display system according to claim 1.

13. The apparatus according to claim 12, wherein the apparatus comprise vehicle equipment, the transparent display unit of the transparent display system is stacked on a windshield of the vehicle or a transparent shell of the outdoor monitor, or is integrated with the windshield together to be an integrated arrangement; or the transparent display panel layer of the transparent display is stacked on the user's glasses or directly functions as the lens of the glasses; or the transparent display panel layer of the transparent display is stacked on shop windows, external windows for a building.

* * * * *